United States Patent
Fan et al.

(10) Patent No.: US 8,363,917 B2
(45) Date of Patent: Jan. 29, 2013

(54) SYSTEM AND METHOD OF IMAGE ARTIFACT REDUCTION IN FAST KVP SWITCHING CT

(75) Inventors: Jiahua Fan, Waukesha, WI (US); Naveen Chandra, Kenosha, WI (US); Andrew Johnson, Milwaukee, WI (US); Jiang Hsieh, Brookfield, WI (US); Fang Dong, Solon, OH (US); Mary Sue Kulpins, Brookfield, WI (US); Peter Crandall, Oconomowoc, WI (US)

(73) Assignee: General Electric Company, Schenectady, NY (US)

( * ) Notice: Subject to any disclaimer, the term of this patent is extended or adjusted under 35 U.S.C. 154(b) by 694 days.

(21) Appl. No.: 12/578,886

(22) Filed: Oct. 14, 2009

(65) Prior Publication Data

US 2011/0085719 A1   Apr. 14, 2011

(51) Int. Cl.
*G06K 9/00* (2006.01)
*A61B 6/00* (2006.01)
*H05G 1/64* (2006.01)

(52) U.S. Cl. ............... 382/131; 382/130; 378/4; 378/5; 378/57; 378/98.9

(58) Field of Classification Search ............... 378/5, 57, 378/98.9; 382/131
See application file for complete search history.

(56) References Cited

U.S. PATENT DOCUMENTS

| | | | |
|---|---|---|---|
| 4,714,997 A * | 12/1987 | Crawford et al. | ............. 600/425 |
| 5,165,100 A | 11/1992 | Hsieh et al. | |
| 6,035,012 A | 3/2000 | Hsieh | |
| 6,215,841 B1 | 4/2001 | Hsieh | |
| 6,233,308 B1 | 5/2001 | Hsieh | |
| 6,408,042 B1 | 6/2002 | Hsieh | |
| 6,421,411 B1 | 7/2002 | Hsieh | |
| 6,529,574 B1 | 3/2003 | Hsieh | |
| 6,944,260 B2 | 9/2005 | Hsieh et al. | |
| 7,050,527 B2 | 5/2006 | Hsieh | |
| 7,415,145 B2 | 8/2008 | Hsieh et al. | |
| 7,515,678 B2 | 4/2009 | Hsieh et al. | |
| 7,532,702 B2 | 5/2009 | Hsieh et al. | |
| 2004/0092814 A1 * | 5/2004 | Hsieh et al. | ............. 600/425 |
| 2005/0053184 A1 * | 3/2005 | Bijjani et al. | ................ 378/4 |
| 2008/0165920 A1 * | 7/2008 | De Man et al. | ............. 378/17 |
| 2008/0226017 A1 * | 9/2008 | Altman et al. | ................ 378/4 |

\* cited by examiner

*Primary Examiner* — Alexander H Taningco
(74) *Attorney, Agent, or Firm* — Ziolkowski Patent Solutions Group, SC

(57) ABSTRACT

A CT system includes a generator configured to energize an x-ray source to a first kilovoltage (kVp) and to a second kVp, and a computer that is programmed to acquire a first view dataset with the x-ray source energized to the first kVp and a second view dataset with the x-ray source energized to the second kVp, generate a base correction image using the first view dataset and the second view dataset, and reconstruct a pair of base material images from the first view dataset and from the second view dataset. The computer is also programmed to estimate artifact correlation in the pair of base material images using the base correction image, generate a pair of final base material images and a final monochromatic image, and correct one of the pair of final base material images and the final monochromatic image at a keV value using the estimated artifact correlation.

26 Claims, 6 Drawing Sheets

SYSTEM AND METHOD OF IMAGE ARTIFACT REDUCTION IN FAST KVP SWITCHING CT

BACKGROUND OF THE INVENTION

Embodiments of the invention relate generally to diagnostic imaging and, more particularly, to an apparatus and method of artifact reduction in a fast kilovoltage (kVp) switching computed tomography (CT) application.

Typically, in CT imaging systems, an x-ray source emits a fan-shaped or cone-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces an electrical signal indicative of the attenuated beam received by each detector element. The electrical signals are transmitted to a data processing system for analysis, which ultimately produces an image.

Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom. Typically, each scintillator of a scintillator array converts x-rays to light energy and discharges the light energy to a photodiode adjacent thereto. Each photodiode detects the light energy and generates a corresponding electrical signal. The outputs of the photodiodes are then transmitted to the data processing system for image reconstruction.

Generally, in the absence of object scatter, a system derives behavior at a different energy based on a signal from two relative regions of photon energy from the spectrum: the low-energy and the high-energy portions of the incident x-ray spectrum. In a given energy region relevant to medical CT, two physical processes dominate the x-ray attenuation: (1) Compton scatter and the (2) photoelectric effect. The detected signals from two energy regions provide sufficient information to resolve the energy dependence of the material being imaged. Furthermore, detected signals from the two energy regions provide sufficient information to determine the relative composition of an object composed of two hypothetical materials, or the effective atomic number distribution with the scanned object.

Techniques to obtain energy sensitive measurements comprise: (1) scan with two distinctive energy spectra, and (2) detect photon energy according to energy deposition in the detector. Such measurements provide energy discrimination and material characterization, and may be used to generate reconstructed images using a base material decomposition (BMD) algorithm. A conventional BMD algorithm is based on the concept that, in an energy region for medical CT, the x-ray attenuation of any given material can be represented by a proper density mix of two materials with distinct x-ray attenuation properties, referred to as the base materials. The BMD algorithm computes two CT images that represent the equivalent density of one of the base materials based on the measured projections at high and low x-ray photon energy spectra, respectively.

A principle objective of energy sensitive scanning is to obtain diagnostic CT images that enhance information (contrast separation, material specificity, etc.) within the image by utilizing two scans at different chromatic energy states. A number of techniques have been proposed to achieve energy sensitive scanning including acquiring two scans either (1) back-to-back sequentially in time where the scans require two rotations of the gantry around the subject, or (2) interleaved as a function of the rotation angle requiring one rotation around the subject, in which the tube operates at, for instance, 80 kVp and 140 kVp potentials.

High frequency generators have made it possible to switch the kVp potential of the high frequency electromagnetic energy projection source on alternating views. As a result, data for two energy sensitive scans may be obtained in a temporally interleaved fashion rather than two separate scans made several seconds apart as typically occurs with previous CT technology. Due to the capability of generating monochromatic-energy images from fast kVp switching, beam hardening artifacts have been largely reduced.

However, x-ray scatter may be present in base material images, which may produce artifacts that are visually similar to beam hardening artifacts. Image artifacts due to x-ray scatter and residue of beam hardening can degrade image quality and may affect diagnostic performance.

Therefore, it would be desirable to design an apparatus and method of reducing x-ray scatter image artifacts in fast kVp switching CT applications.

BRIEF DESCRIPTION OF THE INVENTION

Embodiments of the invention are directed to a method and apparatus for generating fast kVp switching images that overcome the aforementioned drawbacks.

According to an aspect of the invention, a CT system includes a rotatable gantry having an opening for receiving an object to be scanned, an x-ray source coupled to the gantry and configured to project x-rays through the opening, a generator configured to energize the x-ray source to a first kilovoltage (kVp) and to a second kVp to generate the x-rays, a detector having pixels therein, the detector attached to the gantry and positioned to receive the x-rays, and a computer. The computer is programmed to acquire a first view dataset with the x-ray source energized to the first kVp and a second view dataset with the x-ray source energized to the second kVp, generate a base correction image using the first view dataset and the second view dataset, and reconstruct a pair of base material images from the first view dataset and from the second view dataset. The computer is also programmed to estimate artifact correlation in the pair of base material images using the base correction image, generate a pair of final base material images and a final monochromatic image, and correct one of the pair of final base material images and the final monochromatic image at a keV value using the estimated artifact correlation.

According to another aspect of the invention, a method of acquiring CT imaging data includes reconstructing at least two base material images using high and low peak kilovoltage (kVp) CT imaging datasets, generating a monochromatic raw image from the high and low kVp CT imaging datasets, applying one or more parallel beam forward projections to the monochromatic raw image, applying a correction to each of the one or more parallel beam forward projections, summing the corrected one or more parallel beam forward projections to generate a sum of projections, applying a filtered backprojection to the sum of projections using a prescribed fieldof-view, to generate a base corrected image, and estimating artifact correlation based on the base corrected image.

According to yet another aspect of the invention, a computer readable storage medium having stored thereon a computer program comprising instructions which when executed by a computer cause the computer to acquire high and low peak kilovoltage (kVp) CT imaging datasets, reconstruct a first base material image and a second base material image from the high and low kVp CT imaging datasets, generate a raw monochromatic image from the high and low kVp CT imaging datasets, process the raw monochromatic image to separate a first material at a first given threshold, forward project the first separated material, apply projection space processing and a filtered back-projection to the projection of the first separated material to generate a base corrected image, and correct one of a final monochromatic image and the first and second base material images using the base corrected image.

According to another aspect of the invention, a method of acquiring CT imaging data includes reconstructing at least two base material images using high and low peak kilovoltage (kVp) CT imaging datasets, generating a base material raw image from the high and low kVp CT imaging datasets, applying one or more parallel beam forward projections to the base material raw image, applying a correction to each of the one or more parallel beam forward projections, summing the corrected one or more parallel beam forward projections to generate a sum of projections, applying a filtered back-projection to the sum of projections using a prescribed field-of-view, to generate a base corrected image, and estimating artifact correlation based on the base corrected image.

These and other advantages and features will be more readily understood from the following detailed description of preferred embodiments of the invention that is provided in connection with the accompanying drawings.

DETAILED DESCRIPTION OF THE PREFERRED EMBODIMENT

A dual energy CT system and method is disclosed. Embodiments of the invention support the acquisition of both anatomical detail as well as tissue characterization information for medical CT, and for components within luggage. Energy discriminatory information or data may be used to reduce the effects of beam hardening and the like. The system supports the acquisition of tissue discriminatory data and therefore provides diagnostic information that is indicative of disease or other pathologies. This detector can also be used to detect, measure, and characterize materials that may be injected into the subject such as contrast agents and other specialized materials by the use of optimal energy weighting to boost the contrast of iodine and calcium (and other high atomic materials). Contrast agents can, for example, include iodine that is injected into the blood stream for better visualization. For baggage scanning, the effective atomic number generated from energy sensitive CT principles allows reduction in image artifacts, such as beam hardening, as well as provides addition discriminatory information for false alarm reduction.

Diagnostics devices comprise x-ray systems, magnetic resonance (MR) systems, ultrasound systems, computed tomography (CT) systems, positron emission tomography (PET) systems, nuclear medicine, and other types of imaging systems. Applications of x-ray sources comprise medical imaging, security, and industrial inspection applications. In a CT application, scanning may be acquired axially or helically. It will be appreciated by those skilled in the art that a CT implementation is applicable for use with single-slice or multi-slice configurations. Moreover, an implementation is employable for the detection and conversion of x-rays. However, one skilled in the art will further appreciate that an implementation is employable for the detection and conversion of other high frequency electromagnetic energy. An implementation is employable with a "third generation" CT scanner and/or other CT systems. The operating environment of the present invention is described with respect to a sixty-four-slice computed tomography (CT) system. However, it will be appreciated by those skilled in the art that the present invention is equally applicable for use with other multi-slice configurations.

Figure 1:
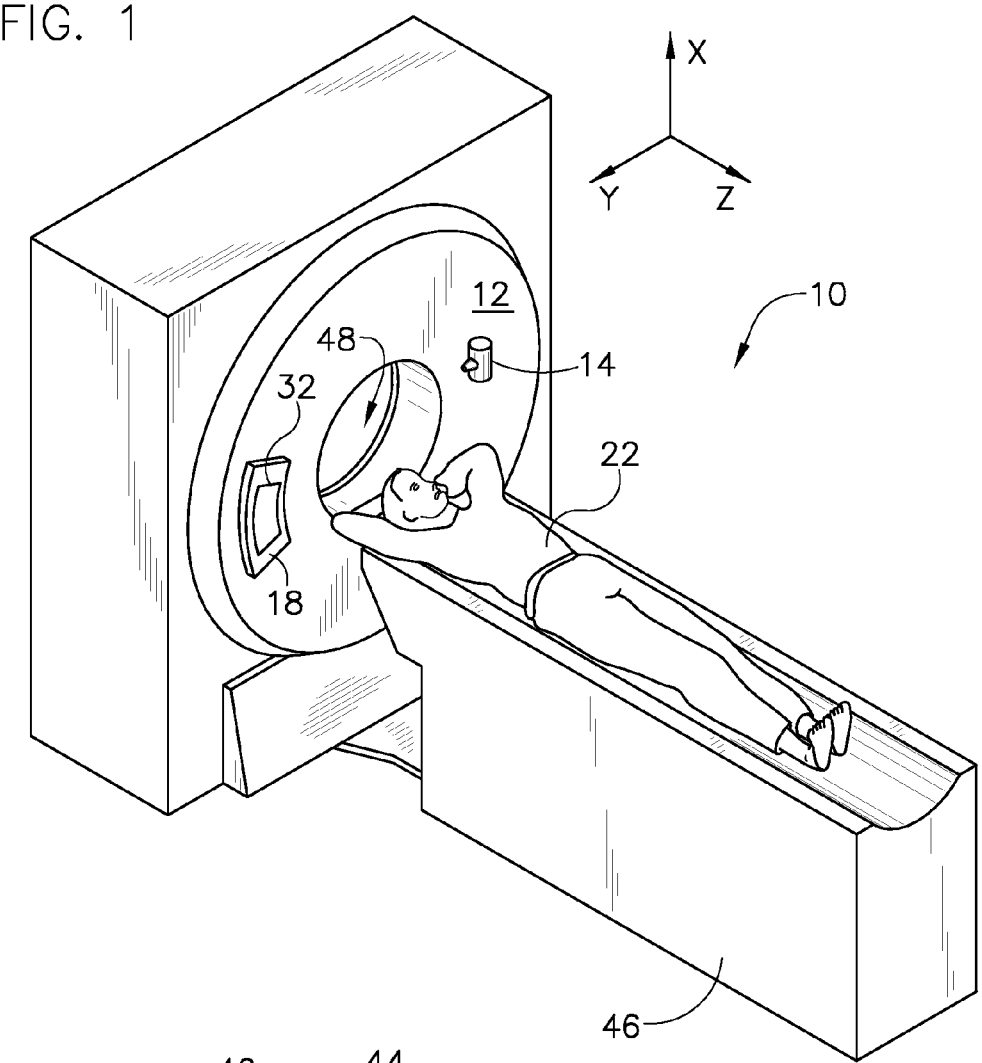
FIG. 1 is a pictorial view of a CT imaging system.
Figure 2:
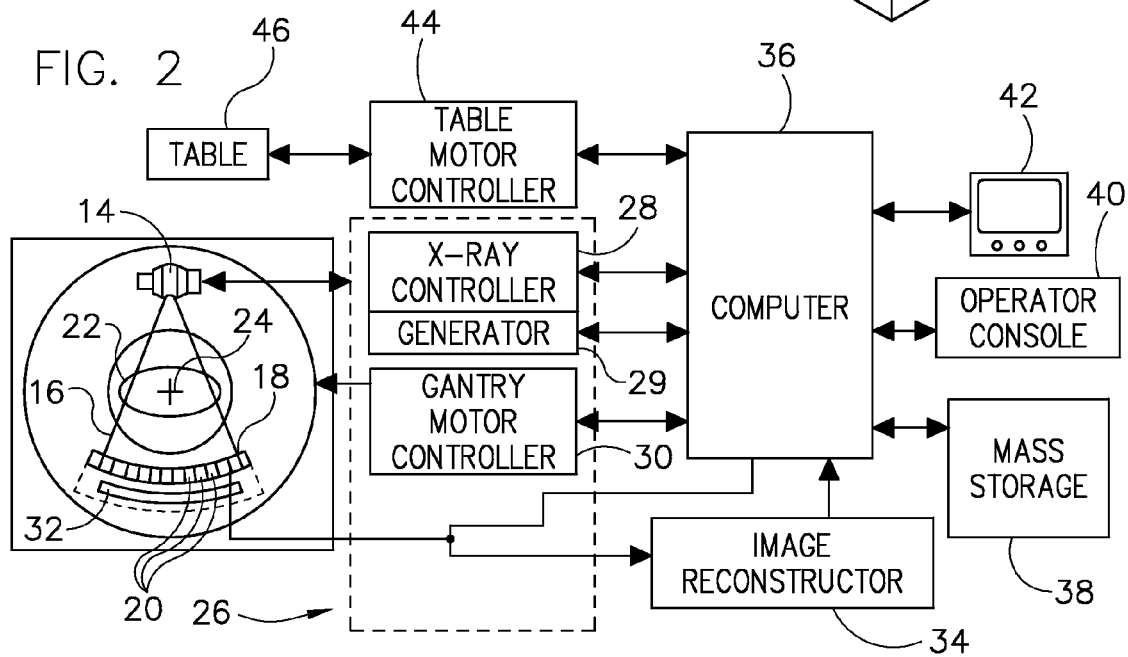
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector assembly or collimator 18 on the opposite side of the gantry 12. In embodiments of the invention, x-ray source 14 includes either a stationary target or a rotating target. Referring now to FIG. 2, detector assembly 18 is formed by a plurality of detectors 20 and data acquisition systems (DAS) 32. The plurality of detectors 20 sense the projected x-rays that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 and generator 29 that provides power and timing signals to an x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30.

In addition, computer 36 operates a table motor controller 44 which controls a motorized table 46 to position patient 22 and gantry 12. Particularly, table 46 moves patients 22 through a gantry opening 48 of FIG. 1 in whole or in part.

Figure 3:
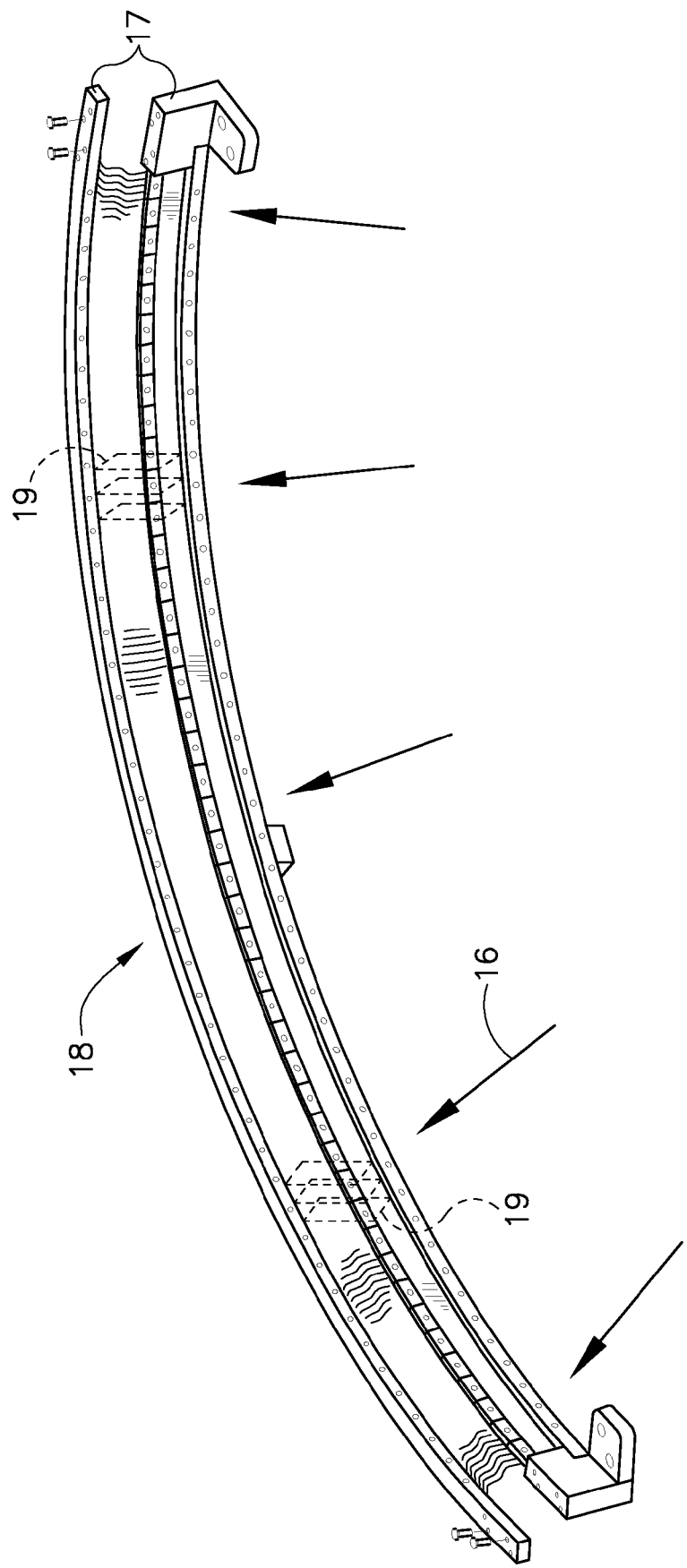
FIG. 3 is a perspective view of one embodiment of a CT system detector array.

As shown in FIG. 3, detector assembly 18 includes rails 17 having collimating blades or plates 19 placed therebetween. Plates 19 are positioned to collimate x-rays 16 before such beams impinge upon, for instance, detector 20 of FIG. 4 positioned on detector assembly 18. In one embodiment, detector assembly 18 includes 57 detectors 20, each detector 20 having an array size of 64×16 of pixel elements 50. As a result, detector assembly 18 has 64 rows and 912 columns (16×57 detectors) which allows 64 simultaneous slices of data to be collected with each rotation of gantry 12.

Figure 4:
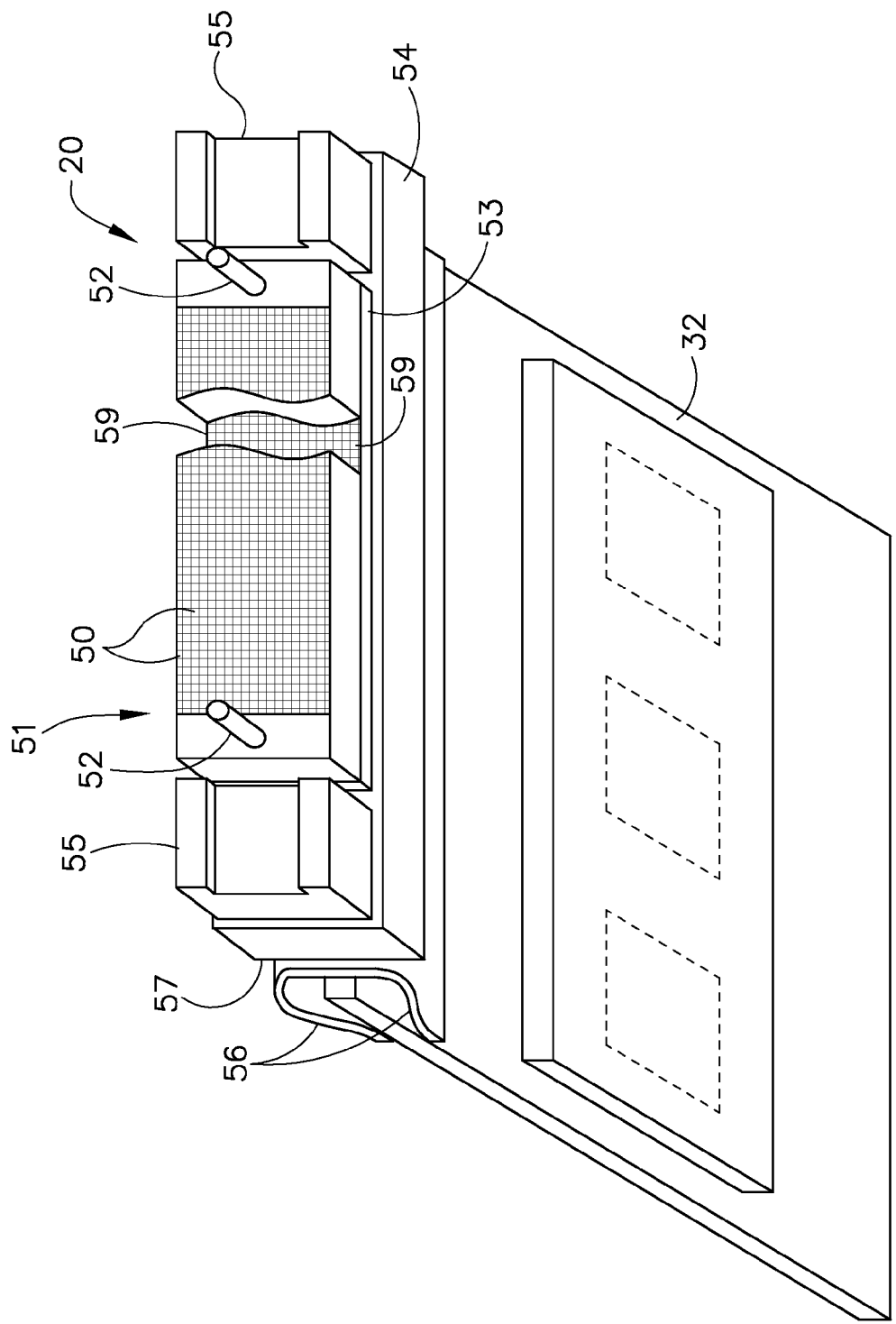
FIG. 4 is a perspective view of one embodiment of a detector.

Referring to FIG. 4, detector 20 includes DAS 32, with each detector 20 including a number of detector elements 50 arranged in pack 51. Detectors 20 include pins 52 positioned within pack 51 relative to detector elements 50. Pack 51 is positioned on a backlit diode array 53 having a plurality of diodes 59. Backlit diode array 53 is in turn positioned on multi-layer substrate 54. Spacers 55 are positioned on multi-layer substrate 54. Detector elements 50 are optically coupled to backlit diode array 53, and backlit diode array 53 is in turn electrically coupled to multi-layer substrate 54. Flex circuits 56 are attached to face 57 of multi-layer substrate 54 and to DAS 32. Detectors 20 are positioned within detector assembly 18 by use of pins 52. In the operation of one embodiment, x-rays impinging within detector elements 50 generate photons which traverse pack 51, thereby generating an analog signal which is detected on a diode within backlit diode array 53. The analog signal generated is carried through multi-layer substrate 54, through flex circuits 56, to DAS 32 wherein the analog signal is converted to a digital signal.

Referring back to FIGS. 1 and 2, an illustrative discussion is now presented in connection with an exemplary implementation of a decomposition algorithm. An image or slice is computed that may incorporate, in certain modes, less or more than 360 degrees of projection data to formulate an image. The image may be collimated to desired dimensions using tungsten blades in front of x-ray source. A collimator typically defines a size and shape of beam of x-rays 16 that emerges from x-ray source 14, and a bowtie filter (not shown) may be included in system 10 to further control dose to patient 22. A typical bowtie filter attenuates beam of x-rays 16 to accommodate a body part being imaged, such as head or torso, such that, in general, less attenuation is provided for x-rays passing through or near an isocenter of patient 22. The bowtie filter shapes x-ray intensity during imaging in accordance with a region-of-interest (ROI), field of view (FOV), and/or target region of patient 22 being imaged.

As x-ray source 14 and detector array 18 rotate, detector array 18 collects data of attenuated x-ray beams. Data collected by detector array 18 undergoes pre-processing and calibration to condition the data to represent line integrals of attenuation coefficients of scanned object or patient 22. The processed data are commonly called projections. Two or more sets of projection data are typically obtained for an imaged object at different tube kVp levels, which change a peak and spectrum of energy of incident photons comprising emitted x-ray beams or, alternatively, at a single tube peak kVp level or spectrum with an energy resolving detector of detector array 18. The acquired sets of projection data may be used for BMD. During BMD, measured projections are converted to a set of density line-integral projections. The density line-integral projections may be reconstructed to form a density map or image of each respective base material, such as bone, soft tissue, and/or contrast agent maps. The density maps or images may be, in turn, associated to form a volume rendering of a base material, for example, bone, soft tissue, and/or contrast agent in an imaged volume.

Once reconstructed, the base material image produced by CT system 10 reveals internal features of patient 22, expressed in densities of two base materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon skill and knowledge of an individual practitioner.

In addition to a CT number or Hounsfield value of Hounsfield Unit (HU), an energy selective CT system can provide additional information related to a material's atomic number and density. This information may be particularly useful for a number of medical clinical applications, where a CT number of different materials may be similar but the atomic number may be quite different. For example, calcified plaque and iodine-contrast enhanced blood may be located together in coronary arteries or other vessels. As will be appreciated by those skilled in the art, calcified plaque and iodine-contrast enhanced blood are known to have distinctly different atomic numbers, but at certain densities these two materials are indistinguishable by CT number alone.

A decomposition algorithm is employable to generate atomic number and density information from energy sensitive x-ray measurements. Multiple energy techniques comprise dual energy, photon counting energy discrimination, dual layered scintillation and/or one or more other techniques designed to measure x-ray attenuation in two or more distinct energy ranges. As an example, any compound or mixture of materials measured with a multiple energy technique may be represented as a hypothetical material having similar x-ray energy attenuation characteristics. This hypothetical material can be assigned an effective atomic number Z. Unlike the atomic number of an element, effective atomic number of a compound is defined by its x-ray attenuation characteristics, and it need not be an integer. This effective Z representation property stems from a well-known fact that x-ray attenuation in an energy range useful for diagnostic x-ray imaging is strongly related to an electron density of compounds, which is also related to the atomic number of materials.

As stated, scatter in base material images may produce artifacts that can degrade image quality. Thus, acquired fast kVp datasets may be processed to generate image correlation information that may be used to correct separately generated base material images, according to embodiments of the invention. As such, high and low kVp datasets may be obtained according to embodiments of the invention. Because base material images generated therefrom may exhibit scatter-generated artifacts, and because such artifacts may have a similar correlation in each of the base material images, it is possible to derive such correlation from a single, monochromatic projection derived therefrom. Similarly, it is possible to derive these correlations from any of the base material images generated. Thus, embodiments of the invention include obtaining high and low kVp projections, using the projections to generate a correction correlation from monochromatic projections derived therefrom, and apply the correction correlation to base material projections.

Figure 5:
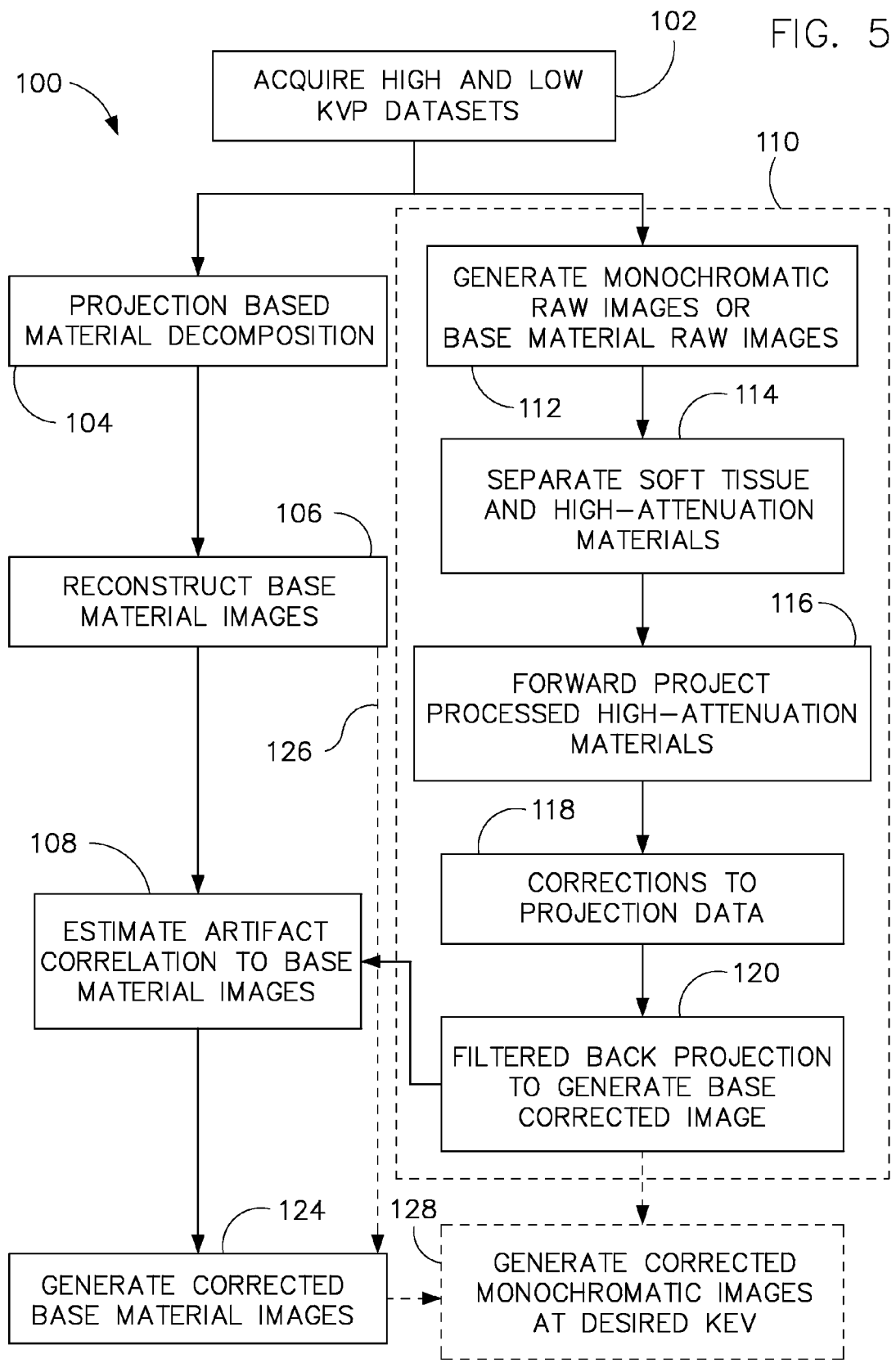
FIG. 5 is a flowchart illustrating a process for correcting images generated via fast kVp switching according to embodiments of the invention.

Referring to FIG. 5, process 100 begins with acquisition of interleaved high and low kVp datasets at step 102 based on energization of the x-ray source at respectively high and low kVp values. Process 100 includes obtaining projection-based material decomposition at step 104 and reconstruction of base material images at step 106, as understood in the art. Artifact correlation to the base material images is estimated at step 108 and applied to each base material image at step 124 using a base-correction image generated via a plurality of steps 110 that begin with generating either monochromatic raw images or base material raw images at step 112 using filtered back-projection and using the high and low kVp datasets acquired at step 102. In one embodiment, the monochromatic raw images are 70 keV images; however, one skilled in the art will recognize that other monochromatic raw images at a different energy may be generated, such as between 65 keV and 75 keV, as examples. After generation of the monochromatic or base material raw images at step 112, the monochromatic raw images are processed to retrieve and separate water-like soft tissue and high-attenuation materials such as human bone, metal implants, and the like at step 114. At step 116, parallel beam forward projections are applied on the high-attenuation materials, and corrections are applied separately on the forward projections at step 118. In embodiments of the invention, the corrections at step 118 are polynomial-form, as an example.

A base-corrected image is formed at step 120 via filtered back-projection of a prescribed field-of-view, and the base correction image is used in artifact estimation as described with respect to step 108 above, based on the forward projections of high-attenuation materials as in step 116. Once artifact estimation is applied to each base material image at step 108, the estimation is applied to each reconstructed base material image at step 124, and monochromatic images at desired keV may be generated at step 128. Typically, monochromatic images may be generated between 40-140 keV, as understood within the art; however, it is to be understood that monochromatic images of any keV value may be generated after being corrected, according to embodiments of the invention.

In an alternate embodiment, still referring to FIG. 5, corrected base materials images are formed 126 at step 124 using the base material images reconstructed at step 106 and an estimation of the artifacts in each image. In this embodiment, artifact correlation of step 108 is foregone, and, after formation of the corrected base materials images at step 124, the monochromatic image is corrected at step 128 using the base corrected image formed at step 120.

Figure 6:
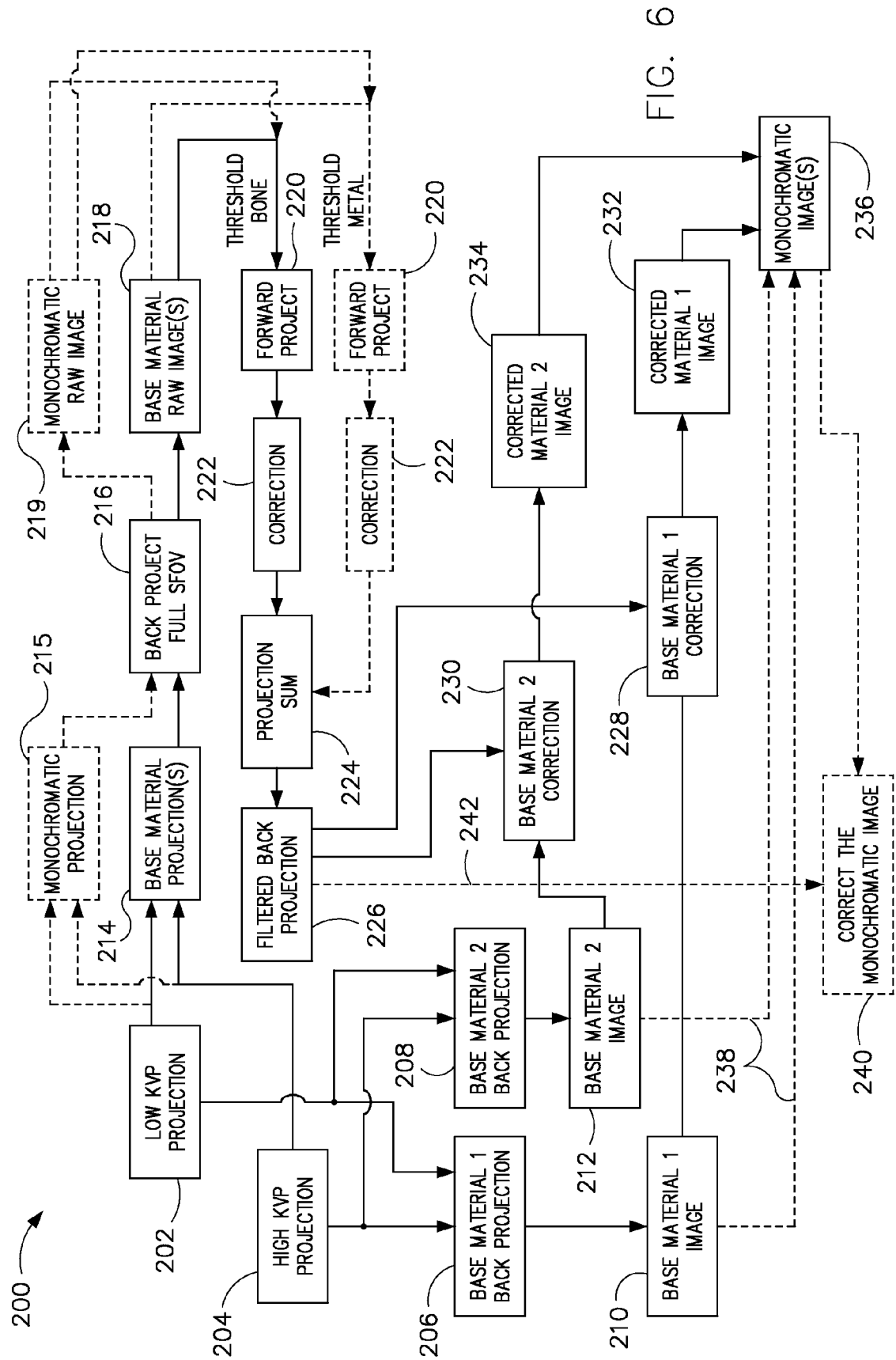
FIG. 6 is a flowchart illustrating a process for correcting images according to embodiments of the invention.

FIG. 6 illustrates a process 200, according to an embodiment of the invention. Process 200 includes acquisition of a low kVp projection 202 and acquisition a high kVp projection 204. The low and high kVp projections 202, 204 are combined as understood in the art to form a first base material projection 206 and a second base material projection 208. First base material projection 206 is used to form a first base material image 210, and second base material projection 208 is used to form a second base material image 212.

According to embodiments of the invention, low and high kVp projections 202, 204 are additionally combined to form one or more base material projections 214 or, alternatively, a single monochromatic projection 215. The one or more base material projections or the single monochromatic projection is/are back-projected in full scan field-of-view (SFOV) at step 216. One or more raw base material images is generated therefrom at step 218, or, alternatively, a monochromatic raw image is generated therefrom at step 219. Either the base material raw image(s) or the monochromatic image is/are then forward projected 220, which may include one or more thresholds such as bone or metal, as examples. For example, bone may have a selected threshold of 200-1000 HU and metal may have a selected threshold of 1000-2000 HU. And, although thresholds of 200-1000 HU and 1000-2000 HU are described herein, one skilled in the art will recognize that any HU threshold may be selected and that multiple forward projections 220 may be formed and corrected according to embodiments of the invention. Thus, according to embodiments of the invention, a single base material raw image may be used (step 218) to derive one or more thresholds therefrom. In an alternate embodiment, two or more base material raw images may be used (step 218), each of which may have a threshold associated therewith. And, in yet another embodiment, a monochromatic raw image may be used (step 219) to derive one or more thresholds therefrom.

In other words, in embodiments where one or more base material projection(s) 214 are used to obtain corrected images, then base material raw image(s) are formed at step 218 and either 1) a single base material raw image may have multiple thresholds associated therewith, or 2) multiple base material raw images may be formed, each of which may have a threshold associated therewith. Alternatively, in embodiments where a monochromatic projection 215 is used to obtain corrected images, then a monochromatic image is formed and may have one or more thresholds associated therewith.

According to embodiments of the invention, low and high kVp projections 202, 204 could be decomposed to form any of the base material projections 214, which can be back-projected in full scan field-of-view (SFOV) at step 216. A single or multiple base material raw image is generated therefrom at step 218. The base material raw image is then forward projected 220, which may include one or more thresholds in order to segment the proper concentrations of such material. One skilled in the art will recognize that any threshold may be selected and that multiple forward projections 220 may be formed and corrected according to embodiments of the invention. In addition, the base material itself may be composed of any material including clinically relevant materials such as bone or titanium for instance.

Thus, one or more corrections 222 may be determined based on the forward projections, and in one embodiment, the correction is a polynomial-form correction. After correction at step 222, if more than one material is separated out and forward projected, then the projections are summed 224 as understood in the art, and a filtered back-projection is applied at step 226 to a prescribed field-of-view. And, if only one material is separated out and forward projected, then the projections summed at step 224 include forward projections only at the given threshold. The filtered back-projection at 226 is used in conjunction with first base material image 210 and second base material image 212 to form respective first base material correction at step 228 and second base material correction at step 230. A corrected first material image is formed at step 232, and a corrected second material image is formed at step 234. Corrected first and second material images are then available to form one or more corrected monochromatic images at various keV values at step 236.

In an alternate embodiment, instead of correcting the first and second base material images 228, 230, monochromatic image(s) may be formed 238 at step 236 via base the first and second base material images formed at steps 210, 212. In this embodiment the monochromatic image(s) formed at step 236 may then be corrected at step 240 directly 242 from the filtered back-projection formed at step 226.

Figure 7:
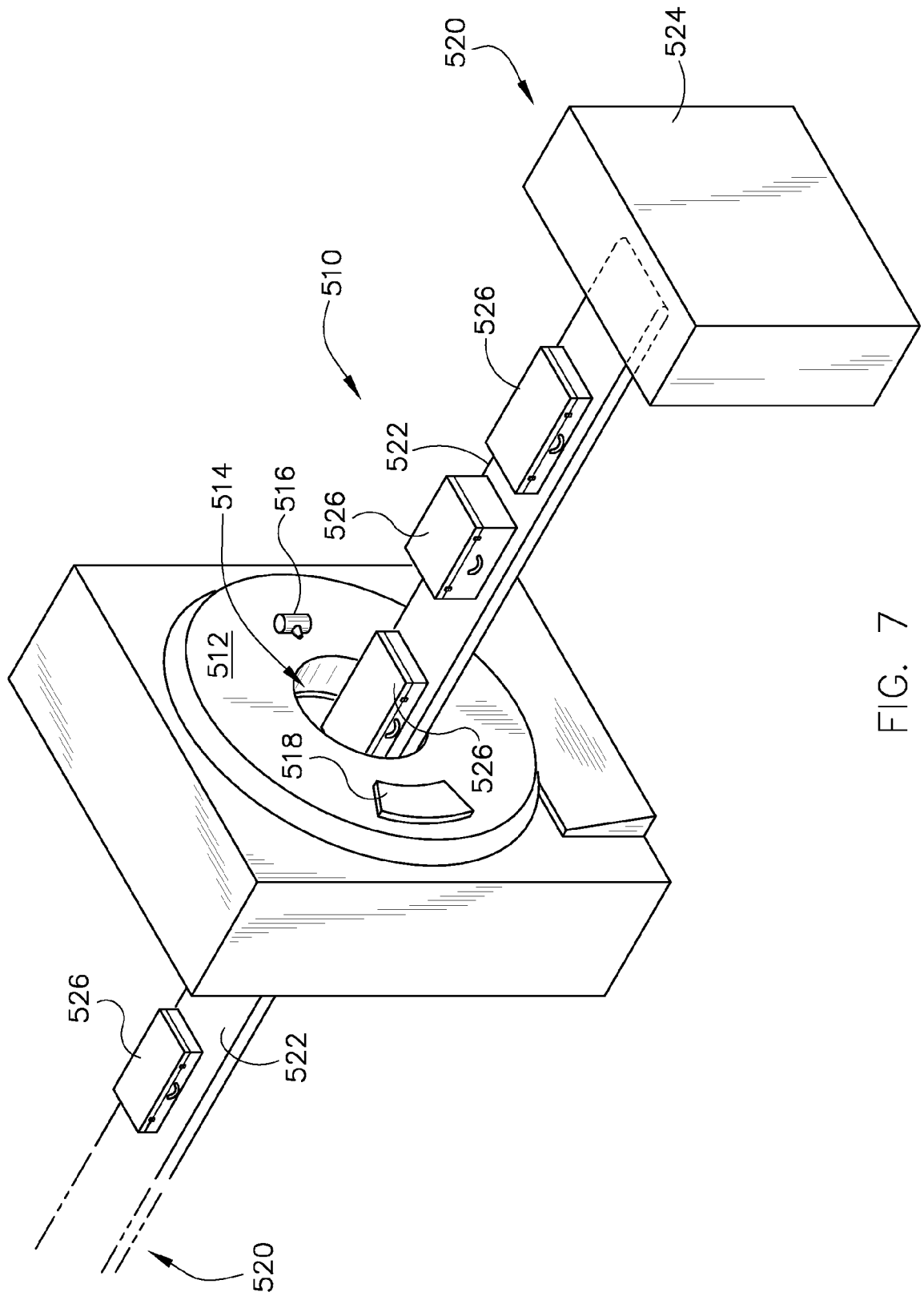
FIG. 7 is a pictorial view of a CT system for use with a non-invasive package inspection system according to an embodiment of the invention.

Referring now to FIG. 7, package/baggage inspection system 510 includes a rotatable gantry 512 having an opening 514 therein through which packages or pieces of baggage may pass. The rotatable gantry 512 houses a high frequency electromagnetic energy source 516 as well as a detector assembly 518 having scintillator arrays comprised of scintillator cells similar to that shown in FIG. 4. A conveyor system 520 also is provided and includes a conveyor belt 522 supported by structure 524 to automatically and continuously pass packages or baggage pieces 526 through opening 514 to be scanned. Objects 526 are fed through opening 514 by conveyor belt 522, imaging data is then acquired, and the conveyor belt 522 removes the packages 526 from opening 514 in a controlled and continuous manner. As a result, postal inspectors, baggage handlers, and other security personnel may non-invasively inspect the contents of packages 526 for explosives, knives, guns, contraband, etc.

An implementation of the system 10 and/or 510 in an example comprises a plurality of components such as one or more of electronic components, hardware components, and/or computer software components. A number of such components can be combined or divided in an implementation of the system 10 and/or 510. An exemplary component of an implementation of the system 10 and/or 510 employs and/or comprises a set and/or series of computer instructions written in or implemented with any of a number of programming languages, as will be appreciated by those skilled in the art. An implementation of the system 10 and/or 510 in an example comprises any (e.g., horizontal, oblique, or vertical) orientation, with the description and figures herein illustrating an exemplary orientation of an implementation of the system 10 and/or 510, for explanatory purposes.

An implementation of the system 10 and/or the system 510 in an example employs one or more computer readable signal bearing media. A computer-readable signal-bearing medium in an example stores software, firmware and/or assembly language for performing one or more portions of one or more implementations. An example of a computer-readable signal-bearing medium for an implementation of the system 10 and/or the system 510 comprises the recordable data storage medium of the image reconstructor 34, and/or the mass storage device 38 of the computer 36. A computer-readable signal-bearing medium for an implementation of the system 10 and/or the system 510 in an example comprises one or more of a magnetic, electrical, optical, biological, and/or atomic data storage medium. For example, an implementation of the computer-readable signal-bearing medium comprises floppy disks, magnetic tapes, CD-ROMs, DVD-ROMs, hard disk drives, and/or electronic memory. In another example, an implementation of the computer-readable signal-bearing medium comprises a modulated carrier signal transmitted over a network comprising or coupled with an implementation of the system 10 and/or the system 510, for instance, one or more of a telephone network, a local area network ("LAN"), a wide area network ("WAN"), the Internet, and/or a wireless network.

According to an embodiment of the invention, a CT system includes a rotatable gantry having an opening for receiving an object to be scanned, an x-ray source coupled to the gantry and configured to project x-rays through the opening, a generator configured to energize the x-ray source to a first kilovoltage (kVp) and to a second kVp to generate the x-rays, a detector having pixels therein, the detector attached to the gantry and positioned to receive the x-rays, and a computer. The computer is programmed to acquire a first view dataset with the x-ray source energized to the first kVp and a second view dataset with the x-ray source energized to the second kVp, generate a base correction image using the first view dataset and the second view dataset, and reconstruct a pair of base material images from the first view dataset and from the second view dataset. The computer is also programmed to estimate artifact correlation in the pair of base material images using the base correction image, generate a pair of final base material images and a final monochromatic image, and correct one of the pair of final base material images and the final monochromatic image at a keV value using the estimated artifact correlation.

According to another embodiment of the invention, a method of acquiring CT imaging data includes reconstructing at least two base material images using high and low peak kilovoltage (kVp) CT imaging datasets, generating a monochromatic raw image from the high and low kVp CT imaging datasets, applying one or more parallel beam forward projections to the monochromatic raw image, applying a correction to each of the one or more parallel beam forward projections, summing the corrected one or more parallel beam forward projections to generate a sum of projections, applying a filtered back-projection to the sum of projections using a prescribed field-of-view, to generate a base corrected image, and estimating artifact correlation based on the base corrected image.

According to yet another embodiment of the invention, a computer readable storage medium having stored thereon a computer program comprising instructions which when executed by a computer cause the computer to acquire high and low peak kilovoltage (kVp) CT imaging datasets, reconstruct a first base material image and a second base material image from the high and low kVp CT imaging datasets, generate a raw monochromatic image from the high and low kVp CT imaging datasets, process the raw monochromatic image to separate a first material at a first given threshold, forward project the first separated material, apply projection space processing and a filtered back-projection to the projection of the first separated material to generate a base corrected image, and correct one of a final monochromatic image and the first and second base material images using the base corrected image.

According to another embodiment of the invention a method of acquiring CT imaging data includes reconstructing at least two base material images using high and low peak kilovoltage (kVp) CT imaging datasets, generating a base material raw image from the high and low kVp CT imaging datasets, applying one or more parallel beam forward projections to the base material raw image, applying a correction to each of the one or more parallel beam forward projections, summing the corrected one or more parallel beam forward projections to generate a sum of projections, applying a filtered back-projection to the sum of projections using a prescribed field-of-view, to generate a base corrected image, and estimating artifact correlation based on the base corrected image.

A technical contribution for the disclosed method and apparatus is that it provides for a computer-implemented apparatus and method of artifact reduction in a fast kVp switching CT application.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Furthermore, while single energy and dual-energy techniques are discussed above, the invention encompasses approaches with more than two energies. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A CT system comprising:
   a rotatable gantry having an opening for receiving an object to be scanned;
   an x-ray source coupled to the gantry and configured to project x-rays through the opening;
   a generator configured to energize the x-ray source to a first kilovoltage (kVp) and to a second kVp to generate the x-rays;
   a detector having pixels therein, the detector attached to the gantry and positioned to receive the x-rays; and
   a computer programmed to:
   acquire a first view dataset with the x-ray source energized to the first kVp and a second view dataset with the x-ray source energized to the second kVp;
   generate a base correction image using the first view dataset and the second view dataset;
   reconstruct a pair of base material images from the first view dataset and from the second view dataset;
   estimate artifact correlation in the pair of base material images using the base correction image;
   generate a pair of final base material images and a final monochromatic image; and
   correct one of the pair of final base material images and the final monochromatic image at a keV value using the estimated artifact correlation.

2. The CT system of claim 1 wherein the computer is programmed to generate the final monochromatic image at the keV value after correcting the pair of final base material images.

3. The CT system of claim 2 wherein the final monochromatic image is in an energy range between 40 keV and 140 keV.

4. The CT system of claim 1 wherein the computer, in being programmed to generate the base correction image, is programmed to generate a monochromatic raw image from the first view dataset and from the second view dataset.

5. The CT system of claim 4 wherein the computer is programmed to generate the monochromatic raw image within a range of monochromatic energy between 65 keV and 75 keV.

6. The CT system of claim 4 wherein the computer is programmed to:
   separate soft tissue and high attenuation materials;
   forward project one or more separated high attenuation materials;
   generate corrections of the one or more forward projected high attenuation materials; and
   generate a filtered back-projection using the correction of the one or more forward projected high attenuation materials.

7. The CT system of claim 6 wherein the computer, in being programmed to generate the correction, is programmed to generate a polynomial correction.

8. A method of acquiring CT imaging data, the method comprising:
   reconstructing at least two base material images using high and low peak kilovoltage (kVp) CT imaging datasets;
   generating a monochromatic raw image from the high and low kVp CT imaging datasets;
   applying one or more parallel beam forward projections to the monochromatic raw image;
   applying a correction to each of the one or more parallel beam forward projections;
   summing the corrected one or more parallel beam forward projections to generate a sum of projections;
   applying a filtered back-projection to the sum of projections using a prescribed field-of-view, to generate a base corrected image; and
   estimating artifact correlation based on the base corrected image.

9. The method of claim 8 wherein generating the monochromatic raw image comprises generating the monochromatic raw image at an energy between a range of approximately 65 keV and 75 keV.

10. The method of claim 8 wherein estimating artifact correlation comprises estimating artifact correlation in the at least two base material images based on the base corrected image.

11. The method of claim 8 comprising generating a final monochromatic image using the at least two base material images.

12. The method of claim 11 wherein estimating artifact correlation comprises estimating artifact correlation to the final monochromatic image based on the base corrected image.

13. The method of claim 11 wherein the final monochromatic image is an image of an energy between 40 keV and 140 keV.

14. The method of claim 8 comprising:
    separating one or more high-attenuation materials from the monochromatic raw image; and
    forward projecting the one or more high-attenuation materials to generate the one or more parallel beam forward projections.

15. The method of claim 8 wherein applying the correction comprises applying a polynomial correction.

16. A computer readable storage medium having stored thereon a computer program comprising instructions, which, when executed by a computer, cause the computer to:
    acquire high and low peak kilovoltage (kVp) CT imaging datasets;
    reconstruct a first base material image and a second base material image from the high and low kVp CT imaging datasets;
    generate a raw monochromatic image from the high and low kVp CT imaging datasets;
    process the raw monochromatic image to separate a first material at a first given threshold;
    forward project the first separated material;
    apply projection space processing and a filtered back-projection to the projection of the first separated material to generate a base corrected image; and
    correct one of a final monochromatic image and the first and second base material images using the base corrected image.

17. The computer readable storage medium of claim 16 wherein the computer is caused to generate the raw monochromatic image by being caused to:
    generate a monochromatic projection from the high and low kVp CT imaging datasets; and
    back project a full scan field-of-view of the generated monochromatic projection.

18. The computer readable storage medium of claim 16 wherein the first given threshold corresponds to one of bone and metal.

19. The computer readable storage medium of claim 18 wherein the threshold that corresponds to bone is approximately 200-1000 Hounsfield Units (HU) and wherein the threshold that corresponds to metal is approximately 1000-2000 HU.

20. The computer readable storage medium of claim 16 wherein the computer is caused to:
process the raw monochromatic image to separate a second material at a second given threshold;
forward project the second separated material; and
apply a filtered back-projection to the projection of the second separated material to generate the base corrected image.

21. The computer readable storage medium of claim 16 wherein the computer is caused to:
process the raw monochromatic image to separate a second material at a second given threshold;
forward project the second separated material;
sum the forward projection of the first separated material and of the second separated material; and
apply projection space processing and a filtered back-projection to the sum of the first separated material and of the second separated base material to generate the base corrected image.

22. A method of acquiring CT imaging data, the method comprising:
reconstructing at least two base material images using high and low peak kilovoltage (kVp) CT imaging datasets;
generating a base material raw image from the high and low kVp CT imaging datasets;
applying one or more parallel beam forward projections to the base material raw image;
applying a correction to each of the one or more parallel beam forward projections;
summing the corrected one or more parallel beam forward projections to generate a sum of projections;
applying a filtered back-projection to the sum of projections using a prescribed field-of-view, to generate a base corrected image; and
estimating artifact correlation based on the base corrected image.

23. The method of claim 22 wherein estimating artifact correlation comprises estimating artifact correlation in the at least two base material images based on the base corrected image.

24. The method of claim 22 comprising generating a final monochromatic image using the at least two base material images.

25. The method of claim 22 comprising:
separating one or more high-attenuation materials from the base material raw image; and
forward projecting the one or more high-attenuation materials to generate the one or more parallel beam forward projections.

26. The method of claim 22 wherein applying the correction comprises applying a polynomial correction.

* * * * *